US012594522B2

(12) United States Patent
England et al.

(10) Patent No.: US 12,594,522 B2
(45) Date of Patent: Apr. 7, 2026

(54) SOLID FILTRATION MEDIUM INCORPORATING POLYACRYLAMIDE POWDER AND CARBON

(71) Applicant: Purafil, Inc., Doraville, GA (US)

(72) Inventors: William G. England, Doraville, GA (US); Jayraj Nayan Joshi, Brookhaven, GA (US)

(73) Assignee: Purafil, Inc., Doraville, GA (US)

( * ) Notice: Subject to any disclaimer, the term of this patent is extended or adjusted under 35 U.S.C. 154(b) by 954 days.

(21) Appl. No.: 17/809,394

(22) Filed: Jun. 28, 2022

(65) Prior Publication Data

US 2023/0023192 A1     Jan. 26, 2023

Related U.S. Application Data

(60) Provisional application No. 63/215,629, filed on Jun. 28, 2021.

(51) Int. Cl.
| | |
|---|---|
| *B01D 53/04* | (2006.01) |
| *B01J 20/08* | (2006.01) |
| *B01J 20/20* | (2006.01) |
| *B01J 20/26* | (2006.01) |
| *B01J 20/30* | (2006.01) |
| *B01J 20/32* | (2006.01) |

(52) U.S. Cl.
CPC ............. *B01D 53/04* (2013.01); *B01J 20/08* (2013.01); *B01J 20/20* (2013.01); *B01J 20/262* (2013.01); *B01J 20/3007* (2013.01); *B01J 20/3078* (2013.01); *B01J 20/3204* (2013.01); *B01D 2253/102* (2013.01); *B01D 2253/104* (2013.01); *B01D 2253/202* (2013.01)

(58) Field of Classification Search
CPC .............. B01D 53/04; B01D 2253/102; B01D 2253/104; B01D 2253/202; B01D 2253/11; B01D 2253/25; B01D 2257/708; B01D 2257/90; B01J 20/08; B01J 20/20; B01J 20/3204; B01J 20/262; B01J 20/3007; B01J 20/3078
USPC ........................................................ 502/402
See application file for complete search history.

(56) References Cited

U.S. PATENT DOCUMENTS

| | | | |
|---|---|---|---|
| 4,855,276 | A | 8/1989 | Osborne et al. |
| 6,265,024 | B1 | 7/2001 | England |
| 8,182,775 | B2 | 5/2012 | England |
| 8,247,346 | B2 | 8/2012 | England |
| 8,586,502 | B2 | 11/2013 | England |
| 8,992,867 | B2 | 3/2015 | England |
| 10,857,518 | B2 | 12/2020 | England |

FOREIGN PATENT DOCUMENTS

| | | | | |
|---|---|---|---|---|
| CN | 112619605 A | * | 4/2021 | ........ B01J 20/28019 |
| WO | WO-0130491 A1 | * | 5/2001 | .......... B01J 20/0233 |

OTHER PUBLICATIONS

CN112619605A_Enlgish_Translation_Description_Claims, Apr. 9, 2021 (Year: 2021).*

Mopoung et al., Sintered filter materials with controlled porosity for water purification prepared from mixtures with optimal ratio of zeolite, bentonite, kaolinite, and charcoal, Applied Clay Science, 2014, 123-128 (Year: 2014).*

* cited by examiner

*Primary Examiner* — Coris Fung

(74) *Attorney, Agent, or Firm* — Kilpatrick Townsend & Stockton LLP

(57)     ABSTRACT

Described herein is a an adsorbent and/or absorbent composition, a method of preparing the adsorbent and/or absorbent composition, and method of treating a fluid stream with the adsorbent and/or absorbent composition. Alumina and carbon are combined with polyacrylamide (PAM) powder and water in preferred proportions and impregnates such as Group 1A metal hydroxides. Group 7A salts of Group 1A metals optionally can be added.

20 Claims, No Drawings

SOLID FILTRATION MEDIUM INCORPORATING POLYACRYLAMIDE POWDER AND CARBON

CROSS REFERENCE TO RELATED APPLICATIONS

The present application claims priority to U.S. Provisional Patent Application No. 63/215,629, filed Jun. 28, 2021, the disclosure which is hereby incorporated by reference in its entirety.

TECHNICAL FIELD

The present disclosure relates generally to methods for reducing corrosion in machinery, electronics, electronics manufacturing facilities, mission critical environments, and heating/venting/air conditioning (HVAC) systems and more specifically to the use of a filtration media for removing one or more contaminants from a fluid stream such as an air flow into electronics, electronics manufacturing facilities, mission critical environments, and HVAC systems.

BACKGROUND

Undesirable airborne compounds, including sulfur compounds, ammonia, formaldehyde, urea, carbon monoxide, oxides of nitrogen, mercaptans, amines, and ethylene, occur in a number of environments, where most primarily are responsible for the presence of disagreeable odors, or irritating or toxic gases. Such environments include petroleum storage areas, sewage treatment facilities, hospital morgues, animal rooms, and pulp and paper production sites, among others. These undesirable compounds may be bacterial breakdown products of higher organic compounds, or by-products of industrial processes.

Hydrogen sulfide ($H_2S$), a colorless, toxic gas with a characteristic odor of rotten eggs, is produced in coal pits, gas wells, sulfur springs, and from decaying organic matter containing sulfur. Controlling emissions of this gas, particularly from municipal sewage treatment plants, has long been considered desirable. More recently, protecting electronic apparatus from the corrosive fumes of $H_2S$ has become increasingly important. $H_2S$ is also flammable.

Ammonia ($NH_3$), also a colorless gas, possesses a distinctive, pungent odor and is a corrosive, alkaline gas. The gas is produced in animal rooms and nurseries and its control also has long been considered desirable.

Chlorine gas ($Cl_2$) is a greenish-yellow gas with a suffocating odor. The compound is used for bleaching fabrics, purifying water, treating iron, and other uses. Control of this powerful irritant is most desirable for the well-being of those who work with it or are otherwise exposed to it. At lower levels, in combination with moisture, chlorine has a corrosive effect on electronic circuitry, stainless steel and the like.

Formaldehyde (HCHO) is a colorless gas with a pungent suffocating odor. It is present in hospital morgues, and because it is intensely irritating to mucous membranes, its control is desirable.

Urea ($CH_4N_2O$) is present in toilet exhaust and is used extensively in the paper industry to soften cellulose. Its odor makes control of this compound desirable.

Carbon monoxide (CO), an odorless, colorless, toxic gas, is present in compressed breathing air. Oxygenation requirements for certain atmospheres, including those inhabited by humans, mandate its control.

Oxides of nitrogen, including nitrogen dioxide ($NO_2$) nitric oxide (NO), and nitrous oxide ($N_2O$), are compounds with differing characteristics and levels of danger to humans, with nitrous oxide being the least irritating oxide. Nitrogen dioxide, however, is a deadly poison. Control of pollution resulting from any of these oxides is desirable or necessary, depending on the oxide.

Mercaptans and amines, including methyl mercaptan ($CH_3SH$), butyl mercaptan ($C_4H_9SH$) and methyl amine ($CH_5N$), are undesirable gases present in sewerage odor. The control of these gases is desired for odor control.

Ethylene ($C_2H_4$) is a colorless, flammable gas that is a simple asphyxiator which accelerates the maturation or decomposition of fruits, vegetables, and flowers. Control of this compound prolongs the marketable life of such items.

Removal of these compounds from fluid streams is desirable for health, environmental, and sustainability reasons.

DETAILED DESCRIPTION

Certain aspects and features of the present disclosure relate to a filtration medium and methods of reducing undesirable airborne compounds in fluid streams by contacting the fluid stream (e.g., an air flow) with a filtration media to remove one or more contaminants from the fluid stream. The compounds may be undesirable because they are corrosive to electronics, electronics manufacturing facilities, mission critical environments (e.g., data centers, control centers, or the like), or HVAC systems; because they are hazardous to human health; or because they are aesthetically offensive. The fluid stream may be any air flow, including but not limited to, air entering, leaving, or flowing through machinery, electronics, electronics manufacturing facilities, mission critical environments, or HVAC systems. The filtration media is used to remove or reduce undesirable contaminants capable of causing corrosion, health hazards, and/or offensive odors, from the fluid stream.

Described herein is a solid filtration medium combining activated carbon, activated alumina, and polyacrylamide (PAM). The filtration medium optionally further includes one or more minerals (e.g., clays or zeolites) and/or one or more impregnates (e.g., potassium hydroxide (KOH) or potassium iodide (KI)). Water can be used during manufacturing of the filtration medium. Typically, however, at least some of the water is removed before the medium is ready for use.

The filtration medium described herein has a higher capacity to adsorb certain undesired compounds at high efficiency from gaseous streams than do conventional filtration media. Surprisingly, use of PAM allows significant reduction in the amount of activated alumina over prior compositions without loss of adsorbing ability. In addition, the PAM provides benefits such as physical strength, which allows the medium to maintain its integrity under rigorous conditions, such as in high velocity airstreams. Further, the binding capability of PAM facilitates use of powdered carbon, which is more cost-effective than granular carbon, but which is also difficult to contain in solid filter beds due to its small size. The filtration medium described herein has increased ignition temperature over carbonaceous materials and also has good hardness, even at very high surface areas, as well as reduced flammability. The adsorbent filtration medium of the present invention exhibits a higher ignition temperature than the carbon compounds of the prior art, which are classified as combustible solids.

Disclosed herein are filtration media, also referred to as adsorbent compositions, generally described as comprising high surface area carbon, activated alumina, PAM, and a small amount of water. In examples, the filtration media are prepared in the form of pellets. While this disclosure refers to adsorbent compositions and adsorbing undesirable compounds, the filtration media described herein may also absorb undesirable compounds, and it should be understood that the term adsorb is used as a matter of convenience to mean removing the undesirable compounds from a fluid stream whether by adsorption or absorption.

Powdered activated carbon, granular activated carbon, and/or carbon black may be used as the high surface area carbon in any adsorbent compositions described herein. Accordingly, as used herein, "high surface area carbon" refers to powdered activated carbon, granular activated carbon, and/or carbon black, individually or in mixtures. In some examples, the high surface area carbon has a surface area between 500 and 1200 $m^2/g$, or optionally between 1050-1150 $m^2/g$. An activated carbon useful in the adsorbent compositions disclosed herein is nuclear grade carbon. Other useful activated carbons are ground activated carbons, such as 207C or 208C (available from Haycarb USA Inc., Oakdale, Pa.). In certain embodiments, powdered activated carbon is most suitable. The size range of the powder is largely a matter of choice, although some parameters are necessary for insuring that uniform pellets are achieved during rolling. A useful carbon is sized for passing 85% through a 325 mesh screen.

Any activated alumina suitable for filtration applications can be used in any adsorbent compositions described herein. As one example, an activated alumina suitable for use in the adsorbent compositions disclosed herein is a composite of 85% -325 mesh alumina (such as that available from BASF Catalysts, Iselin, NJ). Other acceptable activated alumina may be characterized as workable, or dehydrated with a loss on ignition (LOI) characteristic of preferably less than or equal to 10, and most preferably, an LOI of 6.

Any PAM suitable for the filtration applications described herein can be used in any adsorbent compositions described herein. Generally, the PAM is employed in the form of a powder. In some examples, the PAM employed in the adsorbent compositions described herein has a weight-average molecular weight ($M_w$) ranging from 10 to $1 \times 10^9$ (such as that available from BASF Mining Solutions, Tucson, Ariz.). PAM is a binder material, and the $M_w$ can affect the ability to roll the initial mixture and the size of the resultant pellet. Beyond binding, it is believed that PAM may have a positive affect on the adsorption properties of the adsorbent compositions.

In one aspect, the disclosure provides an adsorbent composition comprising from about 1% to about 90% of activated alumina, from about 5% to about 95% of high surface area carbon, from about 1% to about 45% PAM, and from about 5% to about 30% of water, all by weight of the final filtration medium composition.

In some adsorbent compositions described herein the proportion of high surface area carbon in the composition is 50% or more relative to the total combined weight of the carbon, alumina, and PAM. For example, an adsorbent composition described herein can include high surface area carbon in an amount of from about 60% to about 95%, from about 70% to about 95%, from about 80% to about 95%, or from about 85% to about 95%, with all percentages relative to the total weight of the carbon, alumina, and PAM.

In some adsorbent compositions described herein the proportion of activated alumina in the composition is 40% or less relative to the total combined weight of the carbon, alumina, and PAM. For example, an adsorbent composition described herein can include activated alumina in an amount of from about 1% to about 30%, from about 1% to about 20%, from about 1% to about 15%, from about 1% to about 10%, from about 1% to about 8%, from about 1% to about 6%, from about 5% to about 30%, from about 5% to about 20%, from about 5% to about 15%, from about 5% to about 10%, or from about 5% to about 8%, with all percentages relative to the total weight of the carbon, alumina, and PAM.

In some adsorbent compositions described herein the proportion of PAM in the composition is 40% or less relative to the total combined weight of the carbon, alumina, and PAM. For example, an adsorbent composition described herein can include PAM in an amount of from about 1% to about 30%, from about 1% to about 20%, from about 1% to about 15%, from about 1% to about 10%, from about 1% to about 8%, from about 1% to about 6%, from about 5% to about 30%, from about 5% to about 20%, from about 5% to about 15%, from about 5% to about 10%, or from about 5% to about 8%, with all percentages relative to the total weight of the carbon, alumina, and PAM.

In some examples, water is used during manufacturing of the filtration medium, and a drying step removes at least some of the water before the medium is ready for use. Accordingly, in some examples, an adsorbent composition described herein can include water in a proportion of about 30% or less relative to the total combined weight of the carbon, alumina, and PAM. For example, an adsorbent composition described herein can have water in an amount of from about 5% to about 25%, from about 5% to about 20%, from about 5% to about 15%, from about 5% to about 10%, or from about 5% to about 8%, with all percentages relative to the total weight of the carbon, alumina, and PAM.

Optionally, the adsorbent compositions described herein can further include an impregnate operative to cause inactivation of an undesirable substance in a gas stream passing over the composition. As one example, the impregnate can be a hydroxide of a Group 1A metal, a Group 7A salt of a Group 1A metal, or a combination thereof. As non-limiting examples, the impregnates used can be one or more of the following: NaOH, KOH, LiOH, NaCl, KCl, NaBr, KBr, NaI, KI, LiCl, LiBr, LiI, $Na_2S_2O_3$, or $KMnO_4$. In specific examples, a mixture of alumina, carbon, and PAM is impregnated with potassium hydroxide (KOH), potassium iodide (KI), or a combination thereof. It is believed that the KI enhances the action of the KOH catalytically or synergistically. In filtration media described herein, the impregnate(s) can be present in a proportion of about 0.1% to about 15% by weight, relative to the total weight of the carbon, alumina, and PAM. For example, an adsorbent composition described herein can have one or more impregnates in a total amount of from about 0.1% to about 12%, from about 0.1% to about 10%, from about 0.1% to about 8%, from about 0.1% to about 5%, from about 1.0% to about 12%, from about 1.0% to about 10%, from about 1.0% to about 8%, or from about 1.0% to about 5%, with all percentages relative to the total weight of the carbon, alumina, and PAM.

Optionally, the adsorbent compositions described herein can further include one or more minerals, such as a clay (e.g. bentonite) or zeolite. In filtration media described herein, the mineral(s) can be present in a proportion of about 0.1% to about 15% by weight, relative to the total weight of the carbon, alumina, and PAM. For example, an adsorbent composition described herein can have one or more minerals in a total amount of from about 0.1% to about 12%, from about 0.1% to about 10%, from about 0.1% to about 8%, from about 0.1% to about 5%, from about 1.0% to about 15%, from about 1.0% to about 12%, from about 1.0% to about 10%, from about 1.0% to about 8%, or from about 1.0% to about 5%, with all percentages relative to the total weight of the carbon, alumina, and PAM.

In some examples, filtration media described herein include about 1% to about 30% by weight of activated alumina, about 60% to about 95% by weight of high surface area carbon, and about 1% to about 30% by weight of PAM, with all percentages relative to the total weight of the carbon, alumina, and PAM. In some more specific examples, the amount of alumina in the dry mix is from about 1% to about 15% by weight, the amount of activated carbon is from about 80% to about 95% by weight, and the amount of PAM is from about 1% to about 45% by weight. In still other examples, the amount of alumina in the dry mix is from about 5% to about 10% by weight, the amount of activated carbon is from about 85% to about 90% by weight, and the amount of PAM is from about 5% to about 10% by weight. In one specific example, the amount of alumina in the dry mix is about 5% by weight, the amount of activated carbon is about 90% by weight, and the amount of PAM is about 5% by weight. Optionally, any of the foregoing filtration media further includes about 5% to about 30% water, such as about 15% water. Optionally, any of the foregoing filtration media further includes about 1% to about 10% of a mineral, such as about 1% clay. Optionally, any of the foregoing filtration media further includes about 1% to about 10% of an impregnate or combination thereof, such as about 1% impregnate. All percentages of carbon, alumina, PAM, water, minerals, and impregnates are relative to the total weight of the carbon, alumina, and PAM.

The amount of moisture present in the composition in accordance with the present invention will depend on several factors, related primarily to the characteristics of the activated carbon and alumina being treated.

Generally described, the present invention also provides a process for making an adsorbent composition, comprising the steps of forming a mixture including activated alumina, high surface area carbon, PAM, and optionally water, one or more impregnates, and/or one or more minerals into at least one cohesive unit, and curing the cohesive unit at an elevated temperature, for example at least 100° F. for at least 30 minutes. As one example, a dry feed mix is made of the carbon, alumina, and PAM, and the dry feed mix is tumbled, rolled, or extruded while being sprayed with water. In some examples, the at least one cohesive unit is a plurality of pellets. In one non-limiting example, forming the mixture includes mixing the carbon in an amount from 60% to 95% by wt., the alumina in an amount from 1% to 30% by wt., and the PAM in an amount of from 1% to about 30% by wt., based on the total weight of the carbon, the alumina, and the PAM. Optionally, the dry feed mix further includes one or more minerals, such as clay. Optionally, the water is a solution of one or more impregnates.

The combination of high surface area carbon, activated alumina, and PAM may be carried out in any manner which effectively produces an adsorbent formed of a dry mix of those components. For example, the carbon, alumina, and PAM can be combined in a tumble mill and tumbled to form pellets. Optionally, while tumbling, the mixture can be sprayed with water to facilitate pellet formation. In this case, the cohesive unit, e.g., the pellets, will include the carbon, the alumina, the PAM, and water. After tumbling, the pellets are cured at elevated temperature. In some examples, the pellets are cured at a temperature of about 100° F. to about 225° F. for at least one hour. The precise curing temperature and time can be adjusted based on the intended specifications and or the intended end use of the products. For example, the precise curing temperature and time can be adjusted to provide a final water content within a desired range.

Impregnation of an adsorbent composition described herein can be carried out in any manner which effectively produces an adsorbent of about 0.1% to about 15% by weight of impregnate (based on total weight of carbon, alumina, and PAM). For example, impregnation can be carried out using an aqueous solution of about 0.5% to about 50% impregnate.

As one example of an impregnation method, impregnation is carried out by spray addition, in which an aqueous impregnate solution is sprayed onto a dry combination. In that example, the aqueous impregnate solution can be sprayed onto the dry combination while the combination is being tumbled in a mixer. In another example of an impregnation method, impregnation can be carried out simply by submerging the adsorbent composition in impregnate solution (e.g., in one bed volume of impregnate solution). The time required to produce the desired impregnation level is dependent upon the impregnate employed, and will only be as much time as is needed for the impregnate to penetrate the composition.

As one example of an impregnate solution, impregnation with KOH can be carried out using a solution of about 3.0% to about 20.0% KOH. Optionally, a pellet or other mixture impregnated with the KOH solution includes from about 1.0% to about 10.0% of KOH. In other examples, impregnation with KI, NaOH, KCl, NaCl or other suitable impregnates can be carried out in a similar manner. The concentration of the impregnate solution and the method of impregnating can be adjusted to provide a desired final concentration of impregnate in the adsorbent composition Other methods of impregnating the adsorbent compositions would suggest themselves as equally appropriate and these are included within the scope of the present invention. For example, the impregnate solution may be passed through the composition rather than being used in a static immersion treatment. The impregnation treatment of the activated starting material in accordance with the present invention has not been found to be critical with respect to the particular sequence in which the dry mix is impregnated with moisture and impregnates.

The adsorbent composition of the present invention is employed to remove undesired compounds by adsorption of the undesirable compounds from gas streams by contacting the gas stream with the adsorbent composition. The adsorbent filtration media disclosed herein provides improved efficiency in removing acid gases, such as but not limited to hydrogen sulfide ($H_2S$), sulfur oxides ($SO_2$ and $SO_3$), and nitrogen oxides ($NO_x$), from gas streams. At some levels of removal efficiency ("breakthrough efficiency"), pellets embodying the invention will last over 90% longer than activated carbon impregnated with sodium hydroxide, and will provide better removal efficiency. Filtration media embodying the invention are also capable of removing chlorine gas and hydrocarbons from gas streams.

The adsorbent compositions described herein are useful for removing undesired compounds from various gas streams. In some examples, the gas stream flows from an ambient environment into a cleaner environment, such as a clean room, which requires a very low concentration of airborne particulates and other contaminants. Accordingly, in some examples, the adsorbent compositions described herein are placed in an airstream flowing from an ambient or other external environment into a clean environment, such as but not limited to the interior volume of electronic equipment, an electronics manufacturing facility, an HVAC system, or a mission critical environment.

The concentration of undesirable compounds in the gas streams is not considered critical to the process of adsorption, and the inventive adsorbent compositions effectively remove undesirable compounds present in concentrations levels as low as less than one PPB of the compounds passing through the filtration medium per minute.

The physical and chemical makeup of the gas stream from which it is desired to remove undesirable compositions is not critical. For some applications, it may be helpful for oxidizing conditions to prevail but it is not known to what extent oxidation may affect the purification achieved by the present invention. Typically, the undesired compositions will be removed from air, especially from air admixed with effluent gas streams resulting from municipal waste treatment facilities, petrochemical refining plants, hospital and hotel facilities, and so forth. The oxidizing conditions which may be important are generally that oxygen be present in the gas stream being treated, at least in small amounts. This oxygen content is readily found in the gas stream, if air comprises a sufficient portion of the gas stream being treated. If oxygen is totally absent or present in insufficient amounts, oxygen may be independently introduced into the gas stream being treated. A number of factors affect the amount of oxygen which may be required for maximum adsorption in accordance with the present invention, including the concentration and absolute amount of compounds being adsorbed from the gas stream being treated.

With respect to the amount of compound adsorbed, it is recognized that at least the following factors affect the process: the basic degree of attraction of the activated carbon or alumina for the compound; the pore structure and size of the activated carbon and alumina; the specific surface area of the activated carbon and alumina; and the surface characteristics of the activated carbon and alumina.

The adsorbent compositions described herein are appropriately used alone in beds for the removal of undesirable compounds. It is also appropriate, however, to use the compositions in conjunction with beds containing other adsorbents. Any such bed of other adsorbants may be placed either upstream of the disclosed adsorbent compositions (i.e., before the disclosed adsorbent compositions with respect to the effluent gas being treated) or downstream of the disclosed adsorbent compositions.

Flow rates of the gas stream being treated through the bed of adsorbent affect the breakthrough capacities of the adsorbent. As one example, good results are provided by a flow rate between 10 and 750 ft/min, such as between 60 and 100 ft/min, perpendicular to the face of the bed.

This disclosure provides improved adsorbent compositions incorporating activated alumina, high surface area carbon, and PAM, where the adsorbent compositions are useful as improved filtration media for removal of undesirable compounds, such as but not limited to acid gases.

This disclosure further provides methods for producing the improved adsorbent compositions incorporating activated alumina, high surface area carbon, and PAM and methods for using the improved adsorbent compositions as a solid filtration medium.

This disclosure further provides adsorbent compositions that combine and catalyze or exceed the cumulative individual adsorptive and deodorizing or filtering properties of high surface area carbon, activated alumina, PAM, moisture, and optionally minerals and/or impregnates.

This disclosure further provides adsorbent compositions which maintain their integrity in high velocity air streams.

The following examples will serve better to illustrate the disclosed compositions and methods. Reference is made to a tumble mill in the following examples. Such reference is to a small scale rolling disc used in a laboratory setting. The disc is 14" in diameter with a depth of 4". The disc is angled at 30° from the vertical, and operated at a speed of 20 rpm. By comparison, a full scale production disc is typically 48" in diameter with a depth of 4", and is operated at the same angle and the same speed. The laboratory conditions yield pellets that are approximately the same size as the full scale disc, but not as strong, because the periphery of the disc moves at a slower speed. Thus, the pellets do not experience the same amount of force during rolling. Therefore, it is expected that pellets formed on a full scale disc using the same starting materials as described in the following examples would be stronger, and would perform better than as indicated in the examples. It should be noted that the continuous flow systems described in several of the following examples all were operated in a relative humidity of 40-50%.

Example 1

An adsorbent composition is prepared as follows:

A dry feed mix is prepared by combining, by weight, 90% activated carbon powder, 5% activated alumina, 5% PAM, and tumbling the dry feed mix in a tumble mill. While being tumbled, the dry feed mix is sprayed with a 15% KOH aqueous solution at 150-200° F. The wet mixture forms pellets, which are then dried at 135-140° F. in air, relative humidity at about 35%. The resulting cured pellets are useful as a filtration media suitable to neutralize acid gases. Percentages of carbon, alumina, and PAM are based on the total weight of those components.

Example 2

An adsorbent composition is prepared as follows:

A dry feed mix is prepared by combining, by weight, 90% activated carbon powder, 5% activated alumina, and 5% PAM, and tumbling the dry feed mix in a tumble mill. The mixture forms pellets, which are then dried at 135-140° F. in air, relative humidity at about 35%. The resulting cured pellets are useful as a filtration media suitable to remove volatile organic compounds from a fluid stream.

Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A filtration medium comprising high surface area carbon, activated alumina, and polyacrylamide (PAM), wherein the high surface area carbon is present in an amount of from 80% to 95% by wt., the activated alumina is present in an amount of from 1% to 15% by wt., and the PAM is present in an amount of from 1% to about 30% by wt., all based on the total weight of the high surface area carbon, activated alumina, and PAM.

2. The filtration medium of claim 1, further comprising clay in an amount of from 1% to 10% by wt., based on the total weight of the high surface area carbon, activated alumina, and PAM.

3. The filtration medium of claim 1, further comprising an impregnate comprising a hydroxide of a Group 1A metal, a Group 7A salt of a Group 1A metal, or a combination thereof, wherein the impregnate is present in an amount of from 1% to 15% by wt., based on the total weight of the high surface area carbon, activated alumina, and PAM.

4. The filtration medium of claim 1, further comprising water in an amount of from 1% to 30% by wt., based on the total weight of the high surface area carbon, activated alumina, and PAM.

5. A method of producing the filtration medium of claim 1, comprising:
  (a) forming a mixture comprising the high surface area carbon, the activated alumina, and the PAM into at least one cohesive unit; and
  (b) curing the cohesive unit at a temperature of at least 100° F. for at least 30 minutes to form the filtration medium.

6. The method of claim 5, wherein the at least one cohesive unit is a plurality of pellets.

7. The method of claim 5, wherein the mixture further comprises a mineral.

8. The method of claim 7, wherein the mineral comprises clay.

9. The method of claim 5, wherein forming the mixture into at least one cohesive unit comprises tumbling, rolling, or extruding the mixture.

10. The method of claim 5, further comprising spraying the mixture with water, so the at least one cohesive unit comprises the high surface area carbon, the activated alumina, the PAM, and the water; and wherein curing the cohesive unit comprises reducing the concentration of water in the cohesive unit to an amount from about 5% to about 30% by weight based on the total weight of the high surface area carbon, activated alumina, and PAM.

11. The method of claim 10, wherein the water comprises an aqueous solution of a hydroxide of a Group 1A metal, a Group 7A salt of a Group 1A metal, or a combination thereof, so the at least one cohesive unit comprises the high surface area carbon; the activated alumina; the PAM; the water;
  and the hydroxide, the salt, or the combination thereof;
    and wherein curing the cohesive unit comprises reducing the concentration of water in the cohesive unit to an amount from about 5% to about 30% by weight based on the total weight of the high surface area carbon, activated alumina, and PAM.

12. The method of claim 5, wherein the curing step is carried out at a temperature of from about 100° F. to about 225° F. for at least 1 hour.

13. The method of claim 5, wherein forming the mixture comprises mixing the high surface area carbon in an amount from 85% to 95% by wt., the activated alumina in an amount from 1% to 10% by wt., and the PAM in an amount of from 1% to about 20% by wt., based on the total weight of the high surface area carbon, the activated alumina, and the PAM.

14. The method of claim 13, wherein forming the mixture comprises mixing, 90% high surface area carbon, 5% activated alumina, and 5% polyacrylamide, all by weight based on the total weight of the high surface area carbon, activated alumina, and the PAM.

15. A method of removing contaminants from a gas stream, comprising contacting a gas stream comprising contaminants with the filtration medium of claim 1, wherein the filtration medium adsorbs or absorbs one or more contaminants from the gas stream.

16. The method of claim 15, wherein the gas stream flows from an ambient environment into a clean environment, wherein the clean environment is an interior of electronic equipment, an electronic manufacturing facility, a mission critical environment, or an HVAC system.

17. The filtration medium of claim 1, wherein the high surface area carbon comprises powdered activated carbon, granular activated carbon, and/or carbon black.

18. The filtration medium of claim 1, wherein the activated alumina is present in an amount of from 1% to 10% by wt., and the PAM is present in an amount of from 1% to about 10% by wt., both based on the total weight of the high surface area carbon, activated alumina, and PAM.

19. The filtration medium of claim 3, wherein the impregnate comprises KOH, KI, NaOH, KCl, NaCl, or a combination thereof.

20. The filtration medium of claim 19, wherein the impregnate comprises KOH, KI, or a combination thereof.

* * * * *